United States Patent [19]
Traylor

[11] Patent Number: 4,952,195
[45] Date of Patent: Aug. 28, 1990

[54] GRAPHITE DRIVE SHFAT ASSEMBLY

[75] Inventor: John W. Traylor, Hillsdale, Mich.

[73] Assignee: Eagle-Picher Industries, Inc., Cincinnati, Ohio

[21] Appl. No.: 4,897

[22] Filed: Jan. 20, 1987

Related U.S. Application Data

[62] Division of Ser. No. 794,684, Nov. 4, 1985, Pat. No. 4,663,819.

[51] Int. Cl.$^5$ .............................................. F16C 3/02
[52] U.S. Cl. .................................... 464/181; 464/183
[58] Field of Search ................ 464/134, 181, 182, 183

[56] References Cited

U.S. PATENT DOCUMENTS

| 4,192,153 | 3/1980 | Fisher | 464/134 |
| 4,238,539 | 12/1980 | Yates et al. | 464/181 X |
| 4,238,540 | 12/1980 | Yates et al. | 464/181 X |
| 4,248,062 | 2/1981 | McLain et al. | 464/181 |
| 4,279,275 | 7/1981 | Stanwood et al. | 464/181 X |
| 4,451,245 | 5/1984 | Hornig et al. | 464/181 |

FOREIGN PATENT DOCUMENTS 0059163 4/1985 European Pat. Off. .

Primary Examiner—Daniel P. Stodola
Attorney, Agent, or Firm—Wood, Herron & Evans

[57] ABSTRACT

A drive shaft in which a graphite tube has splined yokes inserted at each end. A steel ring surrounds the tube at each end to clamp the tube against the yoke.

1 Claim, 1 Drawing Sheet

GRAPHITE DRIVE SHFAT ASSEMBLY

This is a division of application Ser. No. 794,684, filed Nov. 4, 1985, now U.S. Pat. No. 4,663,819.

This invention relates to a drive shaft for a vehicle. Conventionally a one piece steel drive shaft is connected by universal joints between the vehicle transmission and the rear axle differential.

Some vehicles cannot use a one-piece steel drive shaft. The steel drive shaft is too flexible and, hence, whips between its end points causing undesirable vibration. That whipping problem has been solved by making the drive shaft into two pieces and joining the two pieces through universal joints and a center bearing supported on the vehicle chassis.

It has recently been discovered that the two-piece drive shaft can be eliminated in those vehicles normally requiring it by substituting for the two-piece drive shaft a graphite drive shaft. The graphite drive shaft consists of a layer of glass fibers wound on a mandrel and impregnated with an epoxy resin, a layer of carbon fibers wound on the inner glass fibers in such a way as to produce a substantial axial component of strength, and finally the carbon fibers being enclosed in another layer of glass fibers impregnated with an epoxy resin. The carbon fibers provide the resistance to flexing and thereby eliminate the whipping with its accompanying undesirable vibrations in vehicles requiring a long drive shaft.

The graphite shaft, however, presents the problem of mounting yokes to it at each end to produce the universal joint connections required at the transmission and rear axle. The connection must be great enough to produce a joint which resists a torque loading in excess of 20,000 foot pounds. This requirement in a steel shaft has been met by welding the U-joint connection to the drive shaft. The graphite tube, however, cannot be welded in a conventional manner.

The objective of the present invention has been to provide a connection between the graphite tube and the yoke and the method of making the connection to produce a joint which meets the severe torque requirements required of an automotive vehicle.

This objective of the invention is attained in the following way: the yoke is provided with a shank which is axially broached to produce axially-extending splines around its circumference. The major diameter of the broached shank is such as to create an interference fit with the inside diameter of the graphite tube so that when the shank is pressed into the tube, the splines cut into the tube and provide the resistance to torque. A steel ring is applied to the outside of the tube prior to the insertion of the yoke. The steel ring has an inwardly-directed rim which laps over the end of the graphite tube and provides resistance to radial expansion. As the yoke is pressed into the tube, the ring resists expansion of the tube and forces the splines to cut into the tube to provide the resistance to torque loading. This effect is greater at the edge of the tube where the rim of the ring resists expansion of the ring. Inward of the edge of the tube, the yoke tends to expand the graphite tube against the ring to provide a clamping effect which resists any tendency of the yoke to pull out of the tube.

The several features of the invention will become more readily apparent from the following detailed description taken in conjunction with the accompanying drawings in which.

Figure 2:
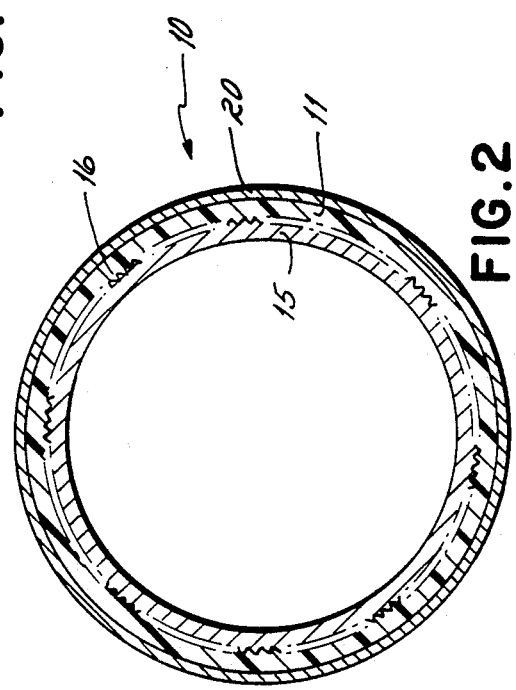
FIG. 2 is a cross sectional view taken on line 2—2 of FIG. 1.

Referring to the drawings, the drive shaft is shown at 10. It includes a long graphite tube 11 having aluminum yokes 12 mounted at each end to form the required universal joint connections with the transmission and rear axle, respectively. The aluminum yoke is preferably produced as an impact forging so that it is very strong but yet light in weight. Each yoke includes a shank 15 which projects into the inside of the tube. As shown in FIG. 2, the shank 15 is externally splined. The forming of the splines 16 is preferably done by broaching as contrasted to the use of a knurling tool. At about an inch from the end of the shank, in the area indicated at 17, the splines are removed to produce an outside diameter less than the inside diameter of the tube to permit it to be partially inserted into the tube and thus centered before the shank is pressed into the tube.

At its outer end, the shank has an annular groove 18. The annular groove 18 provides a recess into which the end portion of the tube can flow under the pressures applied to it to provide a resistance to axial removal of the yoke from the tube.

A steel ring 20 surrounds the outer end of the tube. The steel ring has an inwardly-projecting annular rim 21 which overlaps the end of the tube and abuts a shoulder 22 created between the shank 15 and the external portion 23 of the yoke 12. The dimensions of a typical shaft formed in accordance with the invention are as follows:

The shank has a major diameter (to the tips of the splines 16) of about 3.839 inches. It has a minor outside diameter (to the base of the splines) of 3.797 inches.

The tube has an inside diameter of 3.815 inches, thereby producing an interference of at least about 0.015 inch, for example, 0.024 inch between the tube and the shank. The tube is about 0.340 inch thick. The steel ring has an inside diameter which is substantially the same as the outside diameter of the tube so that it can be slipped by hand over the end of the tube with about 0.003 inch clearance. These dimensions would be proportionally increased or decreased for shafts of differing dimensions.

Figure 1:
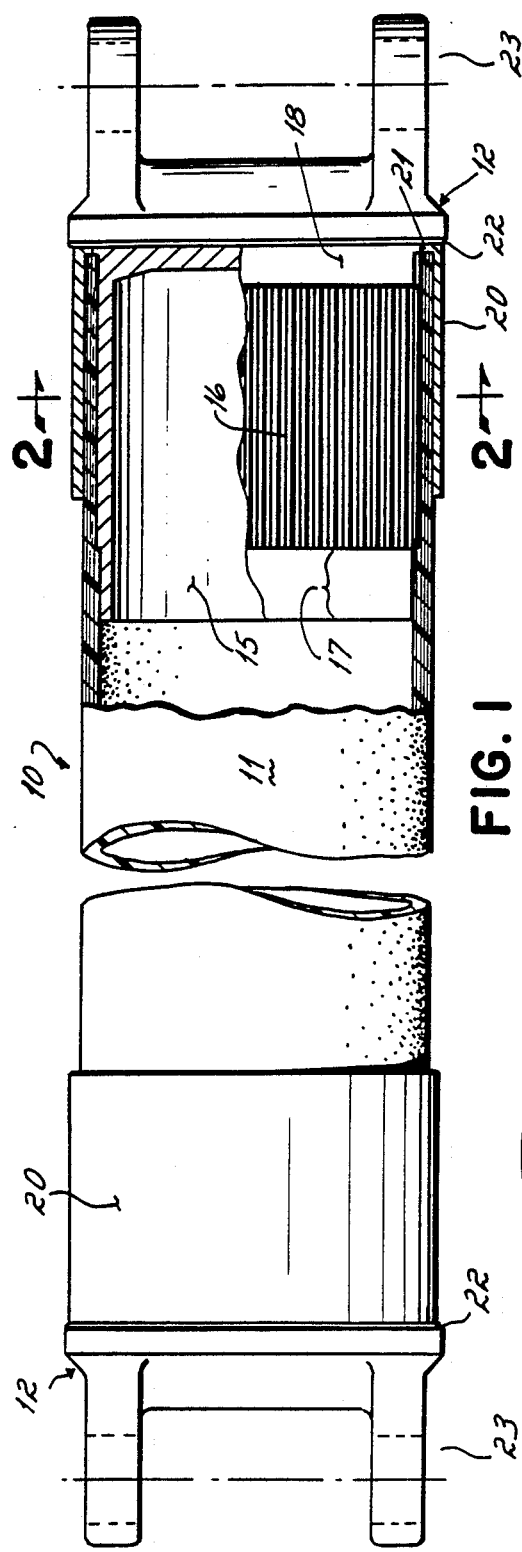
FIG. 1 is a fragmentary view of a drive shaft, partially in cross section.

In assembling the drive shaft, the steel ring 20 is placed on the outside of the tube. The yoke is positioned on the tube with the reduced diameter portion 17 inserted within the tube. A press, applying about 14,000 pounds inserts the shank into the tube to the position shown in FIG. 1. In driving the shank into the tube, the splines cut into the internal surface of the tube. This cutting action is greater at the edge of the tube where the rim 21 of the ring 20 resists outward expansion of the tube. The interference fit tends to expand the tube outwardly against the steel ring to the extent that the diameter of the steel ring increases by 0.0025 inch, thus providing additional resistance to torque as well as axial pull.

The drive shafts produced in accordance with the invention have produced 40,000 inch pounds of torque.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof.

I claim:

1. An automotive drive shaft comprising, a tubular composite shaft having its end portions ground to a uniform circumference, a steel ring placed on each end of said shaft, said steel ring having a radially inwardly-directed rim lying over a portion of the end of said shaft, and an aluminum yoke mounted on each end of said shaft, each yoke having a shank whose outer surface is axially splined, said shank being inserted into said shaft with said splines biting into the internal surface of said shaft, said shaft, steel ring and yoke having an interference fit that increases the diameter of said steel ring in the assembled condition by about 0.0025 inch over the unassembled diameter, an annular groove at the outer end of said shank, said shaft having an end portion overlying said groove and being pressed into said groove by said steel ring to provide a resistance to axial removal of said yoke from said shaft.

* * * * *